June 21, 1966   R. M. TUCK ETAL   3,256,751
TRANSMISSION

Filed Oct. 22, 1962   2 Sheets-Sheet 1

INVENTORS
Robert M. Tuck &
BY Ulysses A. Breting

A. M. Weiter
ATTORNEY

June 21, 1966 R. M. TUCK ETAL 3,256,751
TRANSMISSION
Filed Oct. 22, 1962 2 Sheets-Sheet 2

INVENTORS
Robert M. Tuck &
BY Ulysses R. Breting

A. M. Heiter
ATTORNEY

United States Patent Office 3,256,751
Patented June 21, 1966

3,256,751
TRANSMISSION
Robert M. Tuck and Ulysses A. Breting, Indianapolis, Ind., assignors to General Motors Corporation, Detroit, Mich., a corporation of Delaware
Filed Oct. 22, 1962, Ser. No. 231,917
8 Claims. (Cl. 74—718)

This invention relates to transmissions and more particularly to a transmission employing a dual turbine torque converter and gear unit.

The transmission employs a dual turbine torque converter, a combining gear set and a two speed forward and reverse gear set. In the torque converter, the first turbine provides a high initial torque output at stall, which gradually diminishes to zero torque output at a selected speed ratio in the middle range of speed ratios. The second turbine provides a very low or slightly negative torque at stall, and a gradually increasing torque to the selected speed ratio, thereafter gradually decreasing torque. The first turbine output is connected through a torque multiplying gear set and a one-way clutch operative only in the speed range in which the first turbine provides output torque to the torque converter output. The second turbine is connected through a torque reducing gear set directly to the torque converter output or intermediate shaft to provide reduced torque in the transmission unit. The intermediate shaft drives a two speed forward and reverse transmission unit and is directly connected to the input sun gears of the low and reverse planetary gear sets. In the low gear set the carrier provides the output when the ring gear is held for low ratio drive. The intermediate shaft may also be connected directly to the output carrier by the high clutch to provide high ratio. The output carrier is connected to the ring gear of the reverse gear set and when the carrier of the reverse gear set is held by the reverse brake, reverse drive of the output carrier by the ring gear is provided.

The one-way clutch which connects the first turbine output to the intermediate shaft functions in response to centrifugal force at the speed above which the first turbine provides torque output, if torque is not being transmitted by the clutch, to retain the rollers in a disengaged position in contact with the outer race and out of contact with the inner race. At lower speed, the rollers are automatically spring biased into engaging position to provide the drive when the first turbine output overruns the second turbine output.

Another object of the invention is to provide in a dual turbine torque converter having a gear unit connecting the first and second turbine to a torque converter output shaft employing a one-way clutch operative in response to speed above the maximum speed at which torque is transmitted to disengage the rollers from one race.

Another object of the invention is to provide in a dual turbine torque converter a one-way clutch for interconnecting the first turbine drive to a common output drive which is operative in response to speed to retract the one-way engaging mechanism from engagement with one of the races at speeds above the maximum speed at which the first turbine provides torque.

These and other objects of the invention will be more apparent from the following description and drawings of the preferred embodiment.

Figure 1:
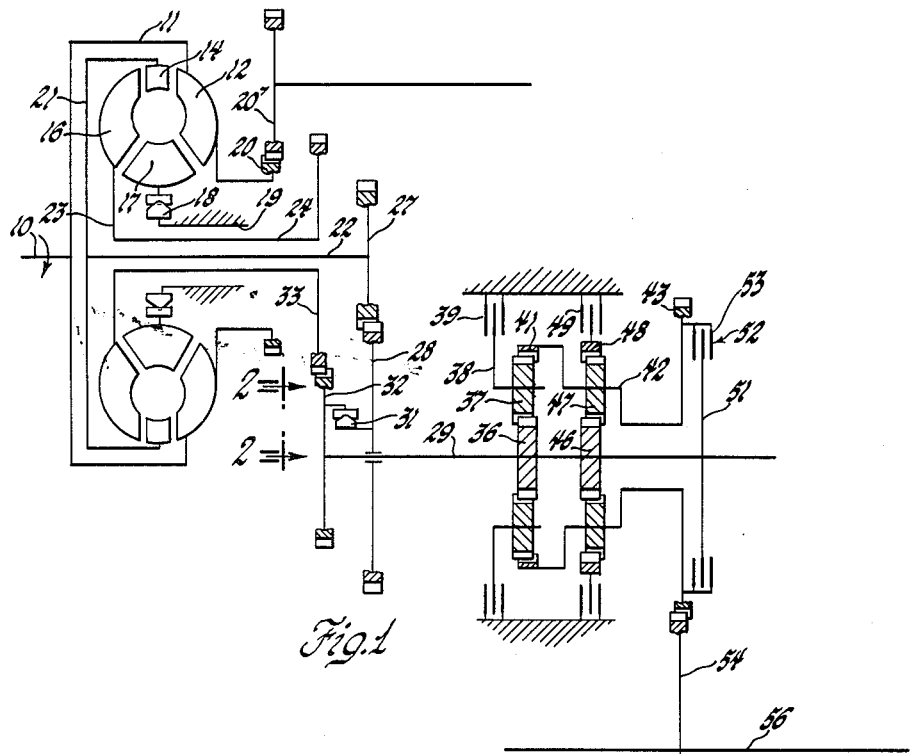
FIGURE 1 is a diagrammatic showing of the torque converter and transmission gearing.

The transmission gearing arrangement, as shown in FIGURE 1, has an input shaft 10 driving a conventional rotary torque converter housing 11 which drives the torque converter pump 12. The torque converter pump 12, the first turbine 14, the second turbine 16 and the stator 17 have conventional inner and outer shells with blading therebetween forming a conventional torque converter torus chamber in which the fluid circulated by the pump 12 flows first to the first turbine 14 to drive the first turbine with an initial high torque at stall and a gradually decreasing torque to a middle range speed ratio preferably approximately .5 speed ratio. The fluid circulates from the first turbine to the second turbine 16 which provides a torque output of about zero torque or a small negative torque at stall, increasing torque to .5 speed ratio and then decreasing torque to coupling. From the second turbine fluid flows through the stator 17 to the pump 12. The stator 17 may be connected by a suitable one-way brake 18 to the grounded sleeve 19. The first turbine 14 is connected by a drum hub 21 to the first turbine output shaft 22. The second turbine 16 is connected by the hub 23 to the second turbine output shaft 24.

A gear 20 fixed on the rotating housing 11 drives the accessory and power takeoff drive gear 20'.

Figure 5:
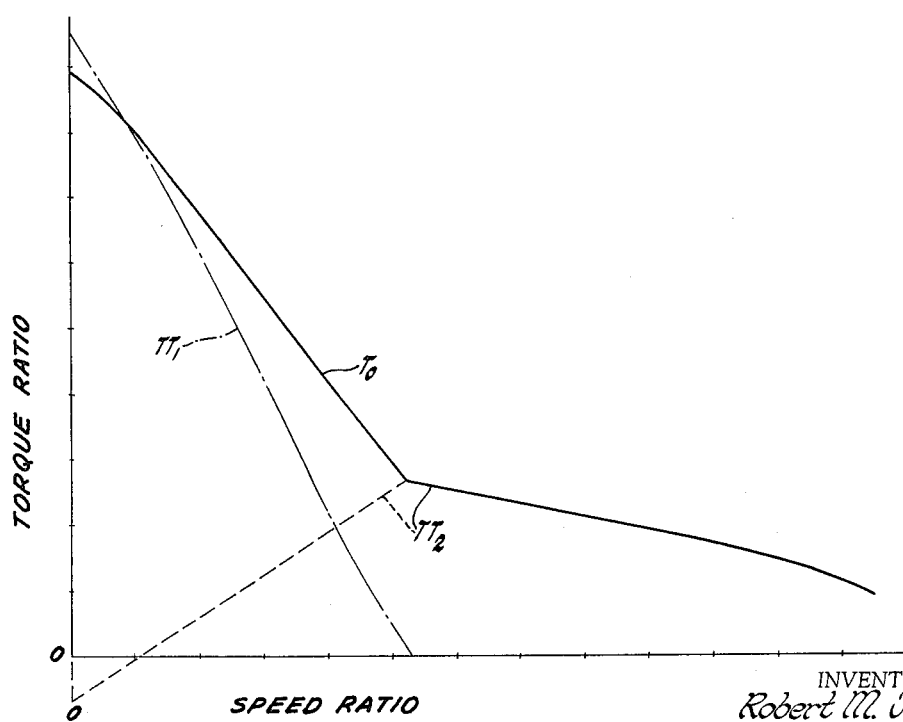
FIGURE 5 shows the transmission operating curves.

The first turbine output shaft 22 drives a spur gear 27 meshing with a spur gear 28 which is rotatably mounted on the intermediate shaft 29 and connected to drive, through the one-way clutch 31, a spur gear 32 which drives the intermediate shaft 29. The second turbine output shaft 24 drives a spur gear 33 which meshes with the spur gear 32 to drive the intermediate shaft 29. The first turbine spur gear set, gears 27 and 28, provides a speed reducing and torque multiplying gear set having a ratio R1 of, i.e., 2.5:1 or 60–24. The second turbine drives the spur gear set 33–32 having a speed increasing and torque reducing ratio R2, i.e., .826:1 or 38–46, to provide a reduced torque on the intermediate shaft or input to the two-speed forward and reverse gear set as shown by torque converter output curve TT2. The relationship, Speed $T1$/Speed $T2 = R1 \times 1/R2$, of these ratios may vary within the limits of the structure. Changing of these ratios has an effect on the stall torque, the mid-range torque and output speed. Increasing the R1 ratio increases the stall torque and decreases the mid-range torque. Increasing the R2 ratio increases the mid-range torque and decreases the output speed of the device by increasing the R2 ratio. Illustrative torque curves for this unit are shown in FIGURE 5 where "torque ratio" is the output torque on shaft 29 over the input torque on shaft 10 and "speed ratio" is the speed of shaft 29 over the speed of shaft 10. The torque delivered by the first turbine to shaft 29 is the torque of the first turbine times R1 as shown in curve TT1. The torque delivered by the second turbine to shaft 29 is the torque of the second turbine times R2 as shown by the curve TT2. Curve To shows the sum or output torque on shaft 29.

The intermediate shaft 29 is the input to the two-speed forward and reverse transmission unit. The intermediate shaft 29 drives the sun gear 36 of the reverse gear set which meshes with planetary pinions 37 mounted on the carrier 38. The carrier 38 is retarded by the reverse brake 39 to hold the carrier so that the input sun gear 36 driving through the pinion 37 drives the ring gear 41 and the associated low speed carrier 42 and output gear 43 in a reverse direction. The intermediate shaft 29 also drives the low speed sun gear 46, which meshes with the planetary pinions 47 mounted on the output carrier 42. The pinions 47 mesh with the ring gear 48 which is held stationary by the low speed brake 49 to provide forward reduction drive of the output carrier 42 and output gear 43. The intermediate shaft 29 also drives the driving plate 51 of the high speed clutch 52 which has a driven plate 53 connected to the output gear 43 located between the low speed gear set and the high speed clutch. The transmission output gear 43 meshes with the final output gear 54 driving the output shaft 56. The output gear set 43–54 provides a speed increasing and torque reducing ratio, i.e., 52–44 to further increase the output speed. If it is desired to provide an overall gear ratio of 1:1 through the transmission when the torque converter is in the coupling stage and the direct drive or high ratio clutch is engaged in the transmission, a speed reducing output gear set may be used.

Figure 2:
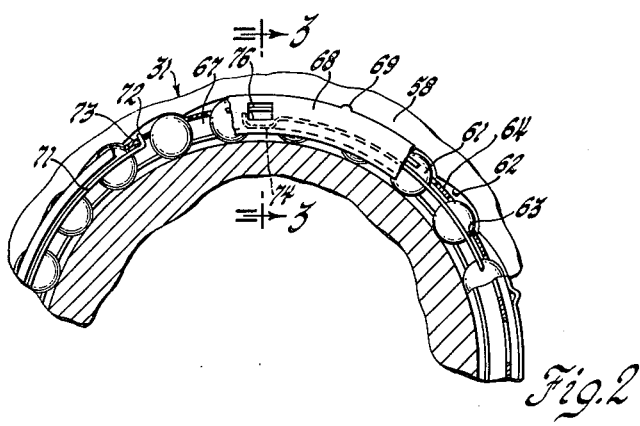
FIGURE 2 is a partial sectional view of the one-way roller clutch viewed as indicated by the line 2—2 in FIGURE 1.
Figure 3:
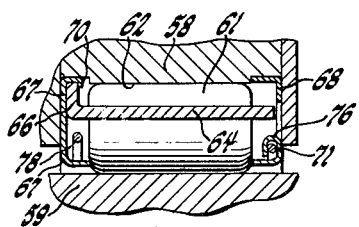
FIGURE 3 is a partial sectional view of FIGURE 2 on the line 3—3.
Figure 4:
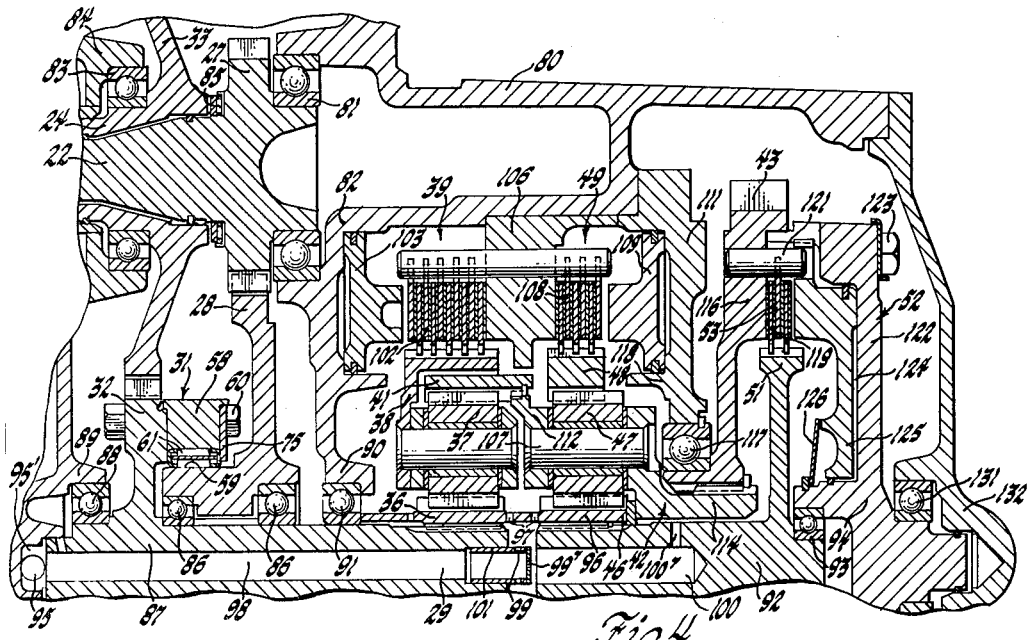
FIGURE 4 is a detailed enlarged view of the transmission gearing.

The one-way roller clutch 31 may be constructed as shown in detail in FIGURES 2 and 3. The outer race 58 is secured to a flat annular face on the gear 32 by bolts 60 (FIG. 4) and provides the output race. The inner race 59 has a cylindrical external surface and is secured to or formed as a part of the gear 28. A plurality of rollers 61 are located between the inner and outer races and each roller cooperates with a tapered cam groove 62 having a deep end permitting clearance of the roller 61 and a tapering surface extending in a counterclockwise direction to reduce the spacing between the races to a distance less than the diameter of the rollers. The rollers are mounted in slots 63 in a cylindrical one-piece cage member 64 which has a stiffening flange 66 at one side. The cage holds the rollers in the proper circumferential spacing for cooperation with each of the cams but permits free radial movement. The cage 64 is mounted and guided for limited rotary movement in a pair of bronze annular bearing members 67 and 68. The projection 70 on bearing 67 engages flange 66 to prevent axial movement of cage 64. Each bearing member has a plurality of securing projections 69 fitting into a similar depression in the outer race 58 to secure the bearing members 67 and 68 to the outer race to prevent rotation. A ring 75, FIG. 4 secured by bolts 60 locates the cage and bearing assembly on the outer race 58. There is a clearance between the inner diameter of the bearing member 67–68 and the inner race 59. A ring-like spring 71 has a bent end hook 72 at one end secured in an aperture 73 in the cage 64 and extends counterclockwise substantially completely around the one-way clutch and is secured to the bearing member 68 by a bent hook portion 74 and a tab 76 bent from the bearing member 68. Spring 78 is similarly attached to bearing member 67 and the cage 64.

The springs 71 and 78 are normally biased to move the cage 64 and all of the rollers 61 in a counterclockwise direction as viewed in FIGURE 2 to urge the rollers into engagement between the cam surface 62 and the inner race 59 to engage the one-way clutch. Under these conditions the inner driving race, if rotating faster than the outer race, would also tend to urge the roller 61 into engagement with the cam surfaces 62 to transmit a drive from the inner driving race 59 to the outer driven race 58. When the torque converter reaches about .5 speed ratio, which in a preferred embodiment is about 1400 r.p.m., for shaft 29, the gear 32 and the outer race 58 for maximum input speed, the centrifugal force acting on the rollers 61, since they are rotating with the outer race, tends to move the rollers 61 outwardly against the cam surface 62 with a sufficiently large force to provide a force component in a tangential direction clockwise sufficient to move the cage and rollers against the biasing force of the springs 71–78 to move the rollers to the deep end of the cam 62. Centrifugal force holds the rollers against the outer race and thus the rollers are removed from contact with the inner race 59 at this point in the operation of the torque converter where the first turbine no longer transmits torque. Thus this one-way roller clutch provides a complete disconnect without any rolling friction between the rollers at speeds above the speed at which the first turbine provides any output torque.

A preferred embodiment of the transmission gearing assembly shown in FIGURE 1 is shown in FIGURE 5. The first turbine output shaft 22 is rotatably supported at the front on the converter pump housing and is rotatably supported and axially located at the rear by the bearing 81 mounted in the portion 82 of the transmission housing 80. Preferably, bearing 81 takes rear thrust and bearing 85 transmits forward thrust to shaft 24 and bearing 83. The second turbine shaft 24 is rotatably supported at the front on the first turbine shaft and is rotatably supported and axially located at the rear by the bearing 83 mounted in another portion 84 of the transmission housing. Preferably, bearing 83 takes forward thrust and rear thrust is transmitted by bearing 85 and shaft 22 to bearing 81. Needle thrust bearing 85 is located between shafts 22 and 24. The shaft 22 drives the gear 27 fixed thereon which meshes with gear 28 rotatably mounted by thrust bearing 86 on the forward portion 87 of intermediate shaft 29. The second turbine shaft 24 has a gear 33 mounted thereon meshing with the gear 32 fixed to the intermediate shaft portion 87 which is rotatably mounted by the thrust bearing 88 in the housing portion 89. This forward shaft portion is also rotatably supported by the bearing 91 mounted in the housing portion 90. The intermediate shaft 29 also has a rear portion 92 rotatably mounted and located by the bearing 93 in the portion 94 of the output carrier assembly 42. The forward intermediate shaft 87 and rear intermediate shaft 92 are each splined to the sleeve shaft 96 which has thereon sun gears 36 and 46. Central apertures 97 in the sleeve shaft are located between the two intermediate shaft portions and supplied with lubricant by the lubricating passage 98 which supplies lubricant via the radial orifices 99 in the passage extension 101 to throw a stream of oil through the apertures 97 to lubricate the gearing, and particularly the carrier pinion shafts. The extension 101 has an axial orifice passage 99′ supplying oil via passages 100 and 100′ to lubricate carrier 42 and clutch plates 53. Lubricant is supplied to passage 98 by lubrication line 95 supplying chamber 95′ in housing portion 89.

The pinions 37 are mounted on the carrier 38 which is splined to the intermediate discs of the friction brake discs 102. The alternate plates of brake discs 102 are suitably splined to the transmission housing 80. The discs are engaged to provide reverse drive by the fluid motor 103 which consists of a piston and a cylinder formed in the housing portion 82. A fixed housing portion 106 provides a suitable fixed abutment for the brake plate 102.

The planetary pinions 47 are mounted on a pinion shaft 107 which is a part of the carrier assembly 42. Pinions 47 mesh with the ring gear 48 which is splined to the intermediate discs of the low brake discs 108. The alternate discs are suitably splined to the housing 80. The fluid motor 109 for actuating the brake discs consist of a piston mounted in the cylinder in the housing portion 111. The housing portion 106 also provides a fixed abutment for the low brake discs. Suitable retraction springs not shown return the low and reverse brake pistons to the disengaged position.

The carrier assembly 42 also includes a member 112 connecting the planetary pinion shaft 107 to the ring gear 41 and a sleeve shaft portion 114 connecting the pinion shaft 107 to the drum portion 116 on which the output gear 43 is mounted. The drum portion 116 is rotatably supported and axially located by the bearing 117 on the housing portion 118. The drum 116 also provides a fixed abutment for the high clutch plates 119 which have alternate plates attached to the driving plate 51 driven by the rear intermediate shaft portion 92 and intermediate plates splined by pins 121 to the drum 16. A cylinder housing 122 is suitably secured by bolts 123 to the drum 116 and has an internal annular recess providing cylinder 124 in which a piston 125 reciprocates to engage the plates 119 to engage the high clutch. The pin 121 fits in an aperture in the piston to prevent rotary movement of the piston. The high clutch is retracted by the Belleville spring 126. The clutch cylinder member 122 rotates with the drum 116 and is rotatably supported and axially located by the bearings 131 mounted in the housing portion 132.

As pointed out above, the low brake 49 and the reverse brake 39 function to provide low and reverse drive of the output gear 43. The high clutch provides a direct drive between the intermediate shaft assembly 29 and the output gear 43. This two-speed and reverse gear arrangement provides a simplified and rugged construction employing large diameter clutches and brakes permitting the use of a large spur gear output drive for a drop box transmission.

It will be appreciated that the above disclosed preferred embodiment may be modified within the scope of the appended claims.

We claim:
1. In a transmission;
   (a) an input member and an output member;
   (b) a torque converter having a pump element driven by said input member, a first turbine element, a second turbine element and a stator;
   (c) said first turbine being driven at a first speed ratio relative to the speed of said second turbine;
   (d) first turbine output shaft means connected to be driven by said first turbine;
   (e) second turbine output sleeve shaft means concentrically located with respect to said first driven output shaft means connected to be driven by said second turbine;
   (f) an intermeditae shaft;
   (g) a spur gear set having a second speed ratio connecting said first turbine output shaft to said intermediate shaft including a one-way clutch operative to drive said intermediate shaft when the first turbine tends to drive the intermediate shaft at a faster speed than the second turbine;
   (h) a second spur gear set having an overdrive ratio connecting said second turbine shaft to said intermediate shaft to drive said intermediate shaft at an increased speed;
   (i) gear means connected to be driven by said intermediate shaft and providing a low forward speed output, a reverse drive output and a direct drive output and including a driven spur gear;
   (j) and said output member having an output spur gear meshing with said driven spur gear and providing a speed reducing ratio to compensate for said overdrive ratio to provide a substantially 1:1 drive through said transmission when the torque converter is in coupling stage and the transmission unit is in direct drive ratio.

2. In a transmission;
   (a) an input member and an output means;
   (b) a torque converter having a pump driven by said input member, a first turbine and a second turbine;
   (c) one of said turbines providing a torque output in one speed range up to a predetermined middle operating speed and no output torque in another speed range at and above said predetermined middle operating speed;
   (d) first drive means connecting said one turbine to said output means including a one way clutch having rotation responsive means operative in response to overrun of said one turbine to provide a drive from said one turbine to said output means and speed responsive means operatively connected to the output means and said rotation responsive means and responsive to the speed of said output means operating to permit a drive by said rotation responsive means in said one speed range in response to said overrun of said one turbine and operative to prevent engagement of a drive in said another speed range on overrun;
   (e) and second drive means connecting said other turbine to said output means;
   (f) and said rotation responsive means of said one-way drive means including a smooth race, a cam race, rollers cooperating with said races to transmit drive in response to torque, a cage engaging each roller to permit only simultaneous uniform movement of all rollers.

3. In a transmission;
   (a) an input member and an output member;
   (b) a torque converter having a pump driven by said input member, a first turbine providing torque, high at stall and gradually diminishing to zero at an intermediate speed ratio, and a second turbine providing torque, substantially zero at stall, increasing to a maximum at an intermediate speed ratio and thereafter gradually diminishing;
   (c) a first gear set including a one way clutch having a cylindrical inner race driven by said first gear set and a multiple cam outer race driving said output member connecting said first turbine to said output member;
   (d) second turbine drive means connecting said second turbine to said output shaft;
   (e) and said one way clutch also having a roller fitting each cam biased by centrifugal force for disengagement, a cage locating each of said rollers for simultaneous movement and biasing spring means connecting said cage and outer race to bias the rollers into engagement when the converter is operating with the first turbine at less than said intermediate speed ratio and ineffective to bias the rollers of the clutch against the bias due to centrifugal force into engagement when above said intermediate speed ratio.

4. In a transmission;
   (a) a drive member and a driven member;
   (b) a torque converter having a pump element driven by said drive member, a first turbine element only operative to provide drive in a low transmission speed ratio range, a second turbine element and a stator;
   (c) first turbine output shaft means connected to be driven by said first turbine;
   (d) second turbine output sleeve shaft means concentrically located with respect to said first driven output shaft means connected to be driven by said second turbine;
   (e) a first spur gear set having a drive gear driven by said first turbine output shaft and a driven gear and connecting said first turbine output shaft to drive said driven gear at a reduced speed;
   (f) a second spur gear set having a drive gear driven by said second turbine shaft and a driven gear driving said driven member connecting said second turbine shaft to said driven member;
   (g) a one way clutch means directly connecting said first driven gear to said second driven gear operative in response to torque to engage to drive said driven member only when the first turbine drives the first driven gear faster than the second turbine drives the second driven gear and only at driven member speeds in said low transmission speed ratio range, and said one-way clutch having a pair of annular members each attached to said driven gears, the outer annular member being at the outer perimeter of one driven gear and having speed responsive means located on and rotatable with the annular member attached to said second driven gear to condition said one-way clutch for drive only when the first driven gear rotates faster than said second driven gear at driven member speeds in said low transmission speed ratio range.

5. The invention defined in claim 4 and said one way clutch means having an inner annular race with a smooth outer surface attached to said first driven gear, the outer annular race being fixed to the side of said second driven gear adjacent the outer perimeter providing a large diameter internal surface having multiple cam recesses in the internal surface, rollers in said cam recesses cooperating with said races and biased by centrifugal force to disengage said one way clutch and spring means operative to bias and simultaneously move said rollers to engage said one way clutch only at driven member speeds in said low transmission speed ratio range.

6. In a transmission;
   (a) an input member and an output member;
   (b) a torque converter having a pump element driven by said input member, a first turbine element, a second turbine element and a stator;
   (c) said first turbine being driven at a first speed ratio relative to the speed of said second turbine;
   (d) a first turbine output shaft connected to be driven by said first turbine;
   (e) a second turbine output sleeve shaft concentrically located with respect to said first driven output shaft means connected to be driven by said second turbine;
   (f) an intermediate shaft;
   (g) a first spur gear set having a first gear fixed on said second turbine output shaft and a second gear fixed on said intermediate shaft to provide a second speed ratio connecting said second turbine shaft to said intermediate shaft to drive said intermediate shaft at an increased speed;
   (h) a second spur gear set having a first gear fixed on said first turbine output shaft and a second gear mounted concentrically for relative rotation on said intermediate shaft to provide a third speed reduction ratio connecting said first turbine output shaft to said intermediate shaft including a one-way clutch having an input race fixed on said second gear of said second gear set and an output race fixed on the second gear of said first gear set operative to drive said intermediate shaft when the first turbine drives the second gear of the second gear set at a faster speed than the second turbine drives the second gear of the first gear set;
   (i) and gear means driven by said intermediate shaft and having an output spur gear driving said output member and having a low speed friction means providing a low forward speed output to said spur gear, having a reverse drive friction means providing a reverse drive output to said output spur gear and having a direct drive clutch selectively directly connecting said intermediate shaft to said output spur gear providing a direct drive output.

7. In a transmission;
   (a) an input member and an output means;
   (b) a torque converter having a pump driven by said input member, a first turbine and a second turbine;
   (c) one of said turbines providing a torque output in one speed range up to a predetermined middle operating speed and no output torque in another speed range at and above said predetermined middle operating speed;
   (d) first drive means connecting said one turbine to said output means including a one-way clutch having rotation responsive means operative in response to overrun of said one turbine to provide a drive from said one turbine to said output means and speed responsive means operatively connected to the output means and said rotation responsive means and responsive to the speed of said output means operating to permit a drive by said rotation responsive means in said one speed range in response to said overrun of said one turbine and operative to prevent engagement of a drive in said another speed range on overrun;
   (e) and second drive means connecting said other turbine to said output means;
   (f) and said first drive means including a first gear, said output means including a second gear located adjacent and coaxial to said first gear, said rotation responsive means being connected to the adjacent side surfaces of said first and second gears, and said speed responsive means being attached to said second gear of said output means adjacent the outer perimeter to provide a high speed responsive centrifugal moment for speed responsive operation.

8. In a transmission;
   (a) an input member and an output means;
   (b) a torque converter having a pump driven by said input member, a first turbine and a second turbine;
   (c) one of said turbines providing a torque output in one speed range up to a predetermined middle operating speed and no output torque in another speed range at and above said predetermined middle operating speed;
   (d) first drive means connecting said one turbine to said output means including a one-way clutch having rotation responsive means operative in response to overrun of said one turbine to provide a drive from said one turbine to said output means and speed responsive means operatively connected to the output means and said rotation responsive means and responsive to the speed of said output means operating to permit a drive by said rotation responsive means in said one speed range in response to said overrun of said one turbine and operative to prevent engagement of a drive in said another speed range on overrun;
   (e) and second drive means connecting said other turbine to said output means;
   (f) and said rotation responsive means of said one-way drive means including a first race, a second race, rolling cam means cooperating with said races to transmit drive in response to torque in one direction, a cage engaging each cam means to permit only simultaneous uniform movement of all said cam means.

References Cited by the Examiner

UNITED STATES PATENTS

| | | | |
|---|---|---|---|
| 781,304 | 1/1905 | Riotte | 74—765 |
| 2,044,197 | 6/1936 | Barthel | 192—45 |
| 2,055,895 | 9/1936 | Fawcett | 74—677 |
| 2,203,177 | 6/1940 | Patterson | 74—677 |
| 2,232,090 | 2/1941 | Anderson | 192—45 |
| 2,259,733 | 10/1941 | Burtnett | 74—740 |
| 2,284,123 | 5/1942 | Breer et al. | 74—677 |
| 2,297,259 | 9/1942 | Speiser | 74—718 |
| 2,368,711 | 2/1945 | Jandasek | 74—731 |
| 2,763,163 | 9/1956 | Seybold | 74—677 |
| 2,795,154 | 6/1957 | Russell | 74—677 |
| 2,873,626 | 2/1959 | Granryd | 74—765 |
| 2,917,950 | 12/1959 | Duffield | 74—730 |
| 2,932,220 | 4/1960 | Nash | 74—688 X |
| 2,950,630 | 8/1960 | Zeidler | 74—732 X |
| 3,102,435 | 9/1963 | Shealy | 74—718 |
| 3,104,744 | 9/1963 | Wade | 192—45 |
| 3,174,598 | 3/1965 | Mattson | 192—45 |

DAVID J. WILLIAMOWSKY, *Primary Examiner.*

DON A. WAITE, *Examiner.*

T. C. PERRY, *Assistant Examiner.*